(12) United States Patent
Kunimatsu et al.

(10) Patent No.: US 8,295,709 B2
(45) Date of Patent: Oct. 23, 2012

(54) VARIABLE DISPERSION COMPENSATION DEVICE

(75) Inventors: Kazuhiro Kunimatsu, Kanagawa (JP); Tsukasa Takahashi, Kanagawa (JP)

(73) Assignees: Fujitsu Telecom Networks Limited, Kanagawa (JP); Fujitsu Limited, Kanagawa (JP)

( * ) Notice: Subject to any disclaimer, the term of this patent is extended or adjusted under 35 U.S.C. 154(b) by 209 days.

(21) Appl. No.: 12/755,254

(22) Filed: Apr. 6, 2010

(65) Prior Publication Data

US 2011/0026941 A1    Feb. 3, 2011

(30) Foreign Application Priority Data

Jul. 31, 2009   (JP) ................................. 2009-179864

(51) Int. Cl.
*H04B 10/12* (2006.01)

(52) U.S. Cl. .......... 398/147; 398/159; 398/209; 398/81; 398/29

(58) Field of Classification Search .......... 398/147–150, 398/208, 202, 209, 140, 81, 158, 159, 29
See application file for complete search history.

(56) References Cited

U.S. PATENT DOCUMENTS

| | | | |
|---|---|---|---|
| 6,742,154 B1 | 5/2004 | Barnard | 714/752 |
| 7,389,049 B2 * | 6/2008 | Takahara et al. | 398/81 |
| 7,450,856 B2 * | 11/2008 | Yoshimoto et al. | 398/159 |
| 7,477,848 B2 * | 1/2009 | Ooi et al. | 398/147 |
| 7,689,126 B2 * | 3/2010 | Nemoto | 398/81 |
| 7,817,925 B2 * | 10/2010 | Honda et al. | 398/209 |
| 8,200,091 B2 * | 6/2012 | Kunimatsu et al. | 398/81 |
| 2002/0089724 A1 * | 7/2002 | Nishimoto et al. | 359/161 |
| 2003/0163771 A1 * | 8/2003 | Tomofuji | 714/48 |
| 2007/0047964 A1 * | 3/2007 | Ooi et al. | 398/147 |
| 2009/0097866 A1 * | 4/2009 | Nakamura | 398/208 |
| 2009/0162074 A1 * | 6/2009 | Nemoto | 398/158 |
| 2009/0317079 A1 * | 12/2009 | Yoshida | 398/29 |
| 2011/0229153 A1 * | 9/2011 | Sekine | 398/208 |

FOREIGN PATENT DOCUMENTS

| | | |
|---|---|---|
| JP | 2002-208892 | 7/2002 |
| WO | WO99/48231 | 9/1999 |

* cited by examiner

*Primary Examiner* — Kenneth N Vanderpuye
*Assistant Examiner* — Hibret Woldekidan
(74) *Attorney, Agent, or Firm* — Ladas & Parry, LLP

(57) ABSTRACT

A dispersion compensation device includes a variable dispersion compensator configured to subject an input optical signal to dispersion compensation, an optical receiver configured to convert an optical signal subjected to dispersion compensation into an electrical signal, recover a clock signal and a received data signal from the electrical signal, and output clock lock information indicating whether the clock signal is locked to the electrical signal, a signal processor configured to output bit error rate information on the received data signal, and a controller configured to variably control a dispersion compensation value of the variable dispersion compensator based on the bit error rate information and the clock lock information.

6 Claims, 3 Drawing Sheets

VARIABLE DISPERSION COMPENSATION DEVICE

CROSS-REFERENCE TO RELATED APPLICATIONS

This application claims priority to Japanese Patent Application No. 2009-179864 filed on Jul. 31, 2009, the disclosures of which is incorporated herein by reference.

BACKGROUND OF THE INVENTION

1. Field of the Invention

The present invention relates to a dispersion compensation device adapted to compensate for waveform distortion of an optical signal using a variable dispersion compensation compensator and capable of long-distance, large-volume transmission.

2. Description of the Related Art

The speed of signals accommodated in a wavelength division multiplexer has been increased from 10 Gpbs to 40 Gbps in order to address the communication traffic in recent years. As the speed of optical signals subject to multiplexing becomes higher, the signals are more likely to be affected by distortion (dispersion) occurring in optical signal pulses on a transmission line. This will require high-precision dispersion compensation technology for canceling the effects from dispersion.

Conventional 10 Gbps signals that are wavelength-multiplexed by a wavelength multiplexer can be received properly by collectively subjecting the signals to dispersion compensation using a dispersion compensation fiber. As the speed of signals is increased to 40 Gbps, however, the dispersion tolerance of the receiving end becomes extremely low. In this regard, it has become necessary to subject signals of individual wavelengths derived from wavelength division to dispersion compensation using a variable dispersion compensator as well as collectively subjecting signals that are wavelength-multiplexed to dispersion compensation. In one known method of controlling a variable dispersion compensator, the bit error rate of a received data signal is monitored and the dispersion compensation value of the variable dispersion compensator is set so that the bit error rate is minimized (see, for example, patent document No. 1).

[patent document No. 1] JP 2002-208892

In the case of the approach of patent document No. 1 whereby the dispersion compensation value is set based on the bit error rate, however, there is a problem in that the setting of an optimal dispersion compensation values takes a very long time. In other words, it takes a long time to search for a dispersion compensation value that minimizes the bit error rate while varying the dispersion compensation value over the entire range of dispersion compensation of the variable dispersion compensator. In particularly, the dispersion tolerance at the receiving end of optical signals becomes poor in response to high-speed optical signals such as 40 Gbps signals. Therefore, since the dispersion compensation value has to be varied in very small steps in order to identify an optimal dispersion compensation value that minimizes the bit error rate, an enormous amount of time is required to control the dispersion compensation value.

SUMMARY OF THE INVENTION

The present invention addresses the above-described background and a purpose thereof is to provide a dispersion compensation device capable of high-speed control of the dispersion compensation value.

In order to address the above-mentioned purpose, the dispersion compensation device according to an embodiment of the present invention comprises: a variable dispersion compensator configured to subject an input optical signal to dispersion compensation; an optical receiver configured to convert an optical signal subjected to dispersion compensation into an electrical signal, recover a clock signal and a received data signal from the electrical signal, and output clock lock information indicating whether the clock signal is locked to the electrical signal; a signal processor configured to output bit error rate information on the received data signal; and a controller configured to variably control a dispersion compensation value of the variable dispersion compensator based on the bit error rate information and the clock lock information.

According to this embodiment, the number of points of measuring the bit error rate is considerably reduced by variably controlling the dispersion compensation value of the variable dispersion compensator based on the bit error rate information and the clock lock information. Therefore, the dispersion compensation value can be controlled at a high speed.

The controller may identify a first dispersion compensation value that allows the clock signal to be locked, by performing a search whereby the dispersion compensation value of the variable dispersion compensator is varied successively in a predetermined first step increment, and, afterwards, the controller variably controls the dispersion compensation value in the neighborhood of the first dispersion compensation value, based on the bit error rate information.

After the first dispersion compensation value is identified by the search, the controller may identify a range of dispersion compensation values in which the bit error rate information is retrievable by performing a search whereby the dispersion compensation value is successively increased from the first dispersion compensation value by a second step increment smaller than the first step increment until a predetermined search termination condition is met.

The predetermined search termination condition may include occurrence of loss of lock of the clock signal. The predetermined search termination condition may include transition from a state in which the bit error rate can be measured to a state in which the rate cannot be measured. The predetermined search termination condition may include origination of a loss of frame signal from the signal processor.

The first step increment may be set to the maximum value on the condition that the clock signal is locked.

Optional combinations of the aforementioned constituting elements, and implementations of the invention in the form of apparatuses, methods, systems, programs, and recording mediums storing the programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
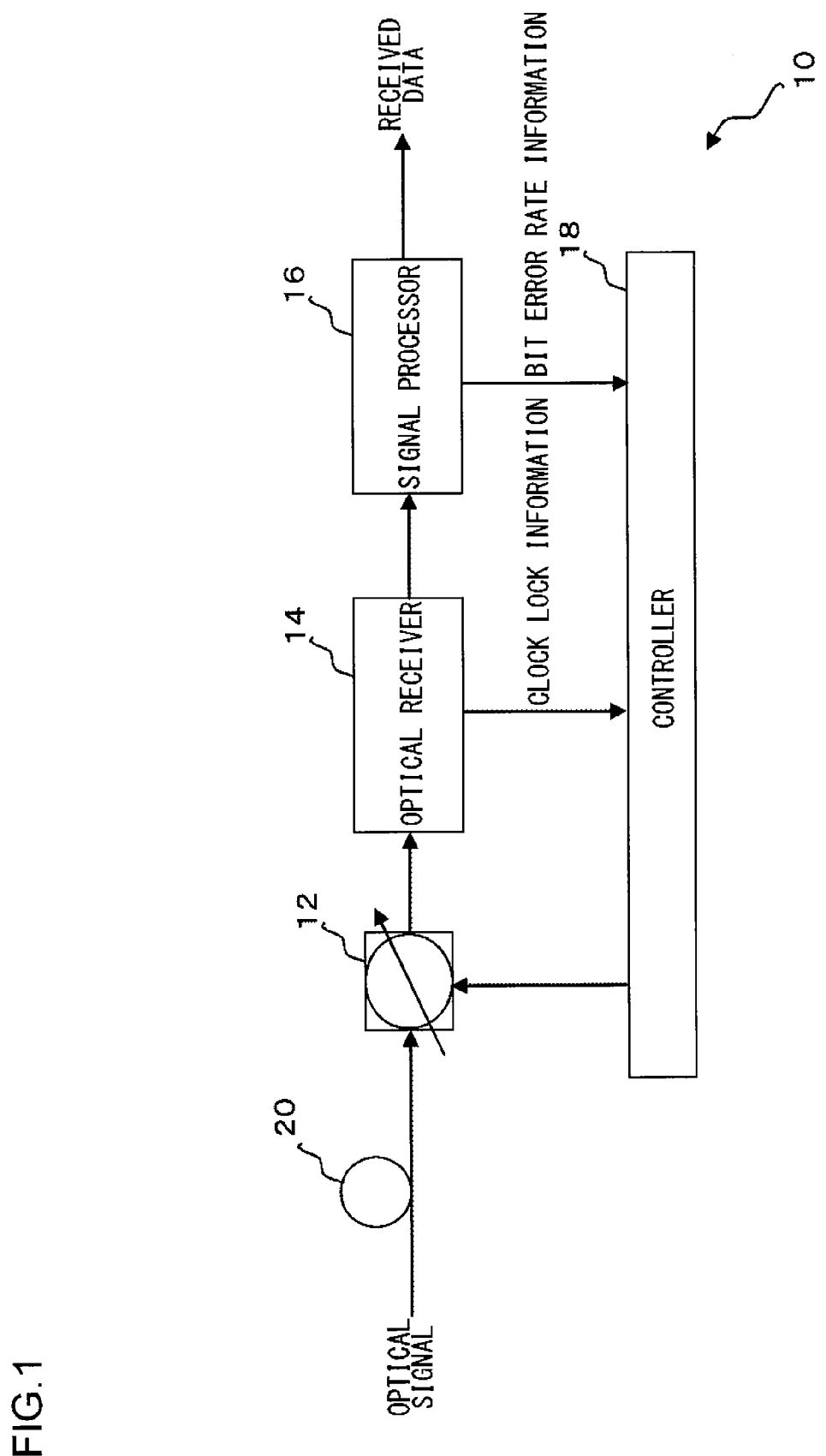
FIG. 1 is a block diagram showing the configuration of a dispersion compensation device according to an embodiment of the present invention.

FIG. 1 is a block diagram showing the configuration of a dispersion compensation device 10 according to an embodiment of the present invention. As shown in FIG. 1, the dispersion compensation device 10 comprises a variable dispersion compensator 12 adapted to subject an input optical signal to dispersion compensation, an optical receiver 14 adapted to convert an optical signal subjected to dispersion compensation into an electrical signal and extracting a clock signal and a received data signal from the electrical signal, a signal processor 16 adapted to subject the received data signal to predetermined signal processing such as error correction, and a controller 18 adapted to variably control the dispersion compensation value of the variable dispersion compensator 12.

The optical signal input to the variable dispersion compensator 12 is delivered via an optical transmission line 20. For example, the compensator 12 receives a high bit rate (e.g., 40 Gbps) optical signal which may undergo waveform distortion due to the dispersion characteristic of the optical transmission line 20. The variable dispersion compensator 12 is a publicly known optical device capable of variably compensating for wavelength dispersion of input light. To be more specific, a virtually-imaged-phased array (VIPA) device or an optical device using fiber-Bragg-grating (FBG) may be used, for example.

The optical receiver 14 is provided with, for example, a photosensitive device that receives the optical signal from the variable dispersion compensator 12 and converting the signal into an electrical signal, and a timing extraction circuit that extracts a clock signal from the electrical signal, and a regenerating circuit that regenerates the electrical signal using the clock signal. The received data signal thus regenerated is output to the signal processor 16. The optical receiver 14 outputs to the controller 18 clock lock information that indicates whether the clock signal is locked to the electrical signal. Clock lock information indicates whether the clock signal is synchronized with the electrical signal.

The signal processor 16 performs error correction using an error correction code included in the received data signal from the optical receiver 14, measuring the bit error rate (BER) and outputting the rate as bit error rate information. Publicly known measuring methods may be used to measure the bit error rate. For example, bit errors may be identified by performing a parity check of the received data signal, or the B1 byte or the B2 byte of a signal conforming to SONET or SHD is used. The signal processor 16 outputs a loss of frame (LOF) signal to the controller 18 when frame synchronization cannot be established despite the fact that the clock signal is locked in the optical receiver 14.

The controller 18 automatically controls the dispersion compensation value of the variable dispersion compensator 12 so that the bit error rate of the optical signal output from the variable dispersion compensator 12 is reduced, based on the bit error rate information sent from the signal processor 16 and the clock lock information output from the variable dispersion compensator 12.

Generally, given that the dispersion compensation value is swept in the variable range of the variable dispersion compensator, the range in which the clock signal is locked is wider than the signal conduction range in which the bit error rate information is retrievable. The signal conduction range is included in the range in which the clock signal is locked. In this embodiment, these relationship is taken advantage of so that the dispersion compensation value that allows the clock signal to be locked is identified by a search, and, afterwards, an optimal dispersion value is determined by a search in the neighborhood of the dispersion compensation value thus identified, based on the bit error rate information. In other words, coarse search for a dispersion compensation value is conducted using the clock lock information. Refined search for a dispersion compensation value is then conducted in the neighborhood of the dispersion compensation value identified by the coarse search, using the bit error rate information. In this way, the number of points of measuring the bit error rate is reduced as compared with the case where a search for a dispersion compensation value is conducted using the bit error rate information from the outset. Therefore, the dispersion compensation value can be controlled at a high speed.

It should be noted, however, that, if the difference between the range in which the clock signal is locked and the signal conduction range in which the bit error rate information is retrievable is large, signal conduction may not be identified immediately even if a search based on the bit error rate information is started in the neighborhood of the dispersion compensation value that allows the clock signal to be locked. Accordingly, the signal conduction range is identified by a search in this embodiment by successively varying the distributed compensation value in predetermined steps while monitoring the bit error rate, after detecting the dispersion compensation value that allows the clock signal to be locked. Monitoring and varying is continued until a predetermined search termination condition is met. The dispersion compensation value is swept in the signal conduction range thus identified by the search so that the dispersion compensation value that minimizes the bit error rate is identified by a search. In this way, high-speed and optimal control of the dispersion compensation value is achieved. The predetermined search termination condition will be described later.

Figure 2:
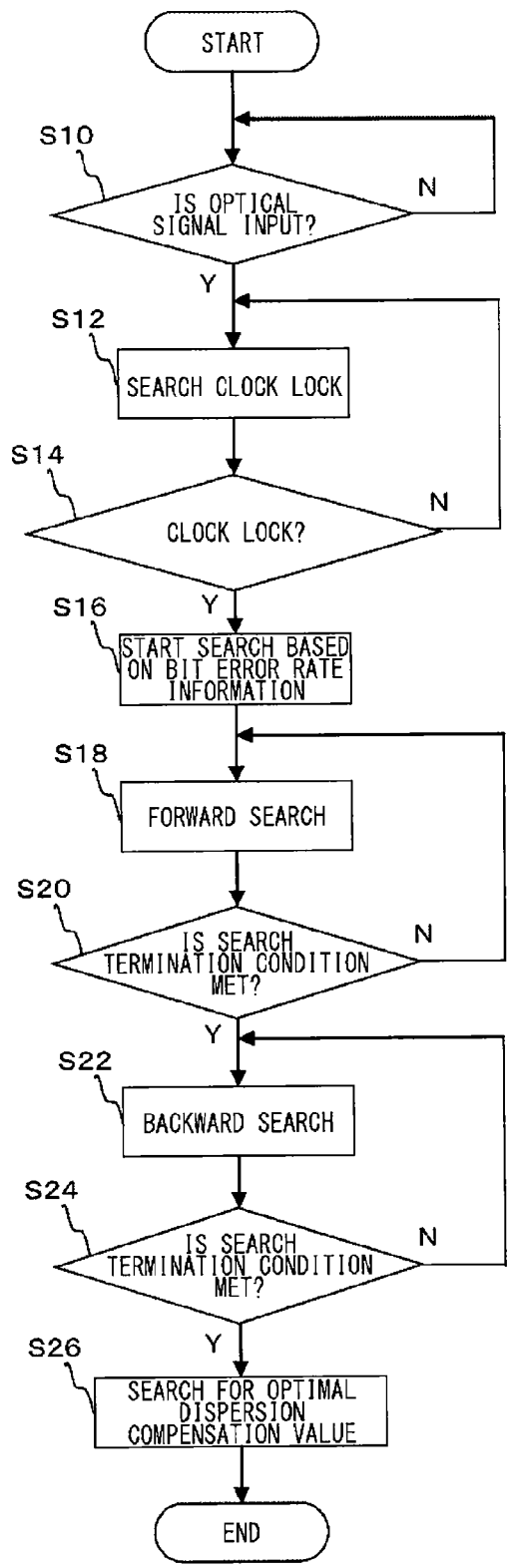
FIG. 2 is a flowchart of a dispersion compensation control process in the dispersion compensation device according to the embodiment.

FIG. 2 is a flowchart of a dispersion compensation control process in the dispersion compensation device 10 according to the embodiment.

Initially, the controller 18 determines whether an optical signal is input to the variable distributed compensator 12 (S10). Whether an optical signal is input is determined by referring to the clock lock information or the bit error rate information. In the absence of an input optical signal (N in S10), the controller 18 stands by until an optical signal is input.

When an optical signal is input (Y in S10), the controller 18 searches for the first dispersion compensation value that allows the clock signal to be locked, based on the clock lock information output from the optical receiver 14 (S12). In this search, the variable dispersion compensator 12 is configured for a predetermined initial dispersion compensation value (e.g., 0 ps/nm) (S12). A determination is then made as to whether the clock signal is locked (S14). If the clock signal is not locked using the initial dispersion compensation value (N in S14), the controller 18 increases or decreases the dispersion compensation value of the variable dispersion compensator 12 by a predetermined increment (the first step increment) (S12), whereupon a determination is made again as to whether the clock signal is locked (S14). The above steps are repeated to identify the first dispersion compensation value that allows the clock signal to be locked. Preferably, the first step increment is set to the maximum value on the condition that the clock signal is locked. In this case, the first dispersion compensation value that allows the clock signal to be locked can be identified in a short period of time.

When the clock signal is locked while the variable dispersion compensator 12 is configured for the first dispersion compensation value (Y in S14), the controller 18 starts searching for a dispersion compensation value based on the bit error rate information (S16). Initially, the controller 18 performs a search where the dispersion compensation value is varied in the direction of increase from the first dispersion compensation value and the bit error rate information retrieved (S18). This search will be referred to as forward search.

In a forward search, the dispersion compensation value is increased from the first dispersion compensation value by an increment (the second step increment) smaller than the first step increment, and the bit error rate information is retrieved (S18). The controller 18 then determines whether a predetermined search termination condition is met (S20). The search termination condition according to this embodiment is that: (1) loss of lock of the clock signal occurs; (2) transition occurs from a state in which the bit error rate can be measured to a state in which the rate cannot be measured; or (3) the signal processor 16 originates a loss of frame (LOF) signal. When at least one of these search termination conditions is met (Y in S20), the controller 18 terminates the forward search. When none of these search termination conditions is met (N in S20), the controller 18 further increases the dispersion compensation value by the second step increment, retrieves the bit error rate information (S18), and determines whether at least one of the above search termination conditions is met (S20). By repeating these steps, the signal conduction range in which the bit error rate information is retrievable is identified in the direction of increase in which the dispersion compensation value is increased from the first dispersion compensation value. While the search termination condition according to the embodiment includes the above three conditions, the search termination condition may include one of the three conditions, or any two of the three conditions.

When the forward search is completed, the controller 18 performs a search where the dispersion compensation value is varied in the direction of decrease from the first dispersion compensation value (S22). This search will be referred to as backward search. In a backward search, the dispersion compensation value is decreased from the first dispersion compensation value by the second step increment, and the bit error rate information is retrieved. The controller 18 then determines whether a predetermined search termination condition is met (S24). The search termination condition is as described in (1)-(3) above. When at least one of these search termination conditions is met (Y in S24), the controller 18 terminates the backward search. When none of these search termination conditions is met (N in S24), the controller 18 further decreases the dispersion compensation value by the second step increment (S22) and determines whether at least one of the above search termination conditions is met (S24). By repeating these steps, the signal conduction range in which the bit error rate information is retrievable is identified in the direction of increase in which the dispersion compensation value is decreased from the first dispersion compensation value.

Through the forward and backward searches as described above, the signal conduction range in which the bit error rate information is retrievable can be identified at a high speed. The controller 18 can perform high-speed and optimal dispersion compensation control by sweeping the dispersion compensation value over the signal conduction range thus identified and searching for a dispersion compensation value that minimizes the bit error rate (S26).

Figure 3:
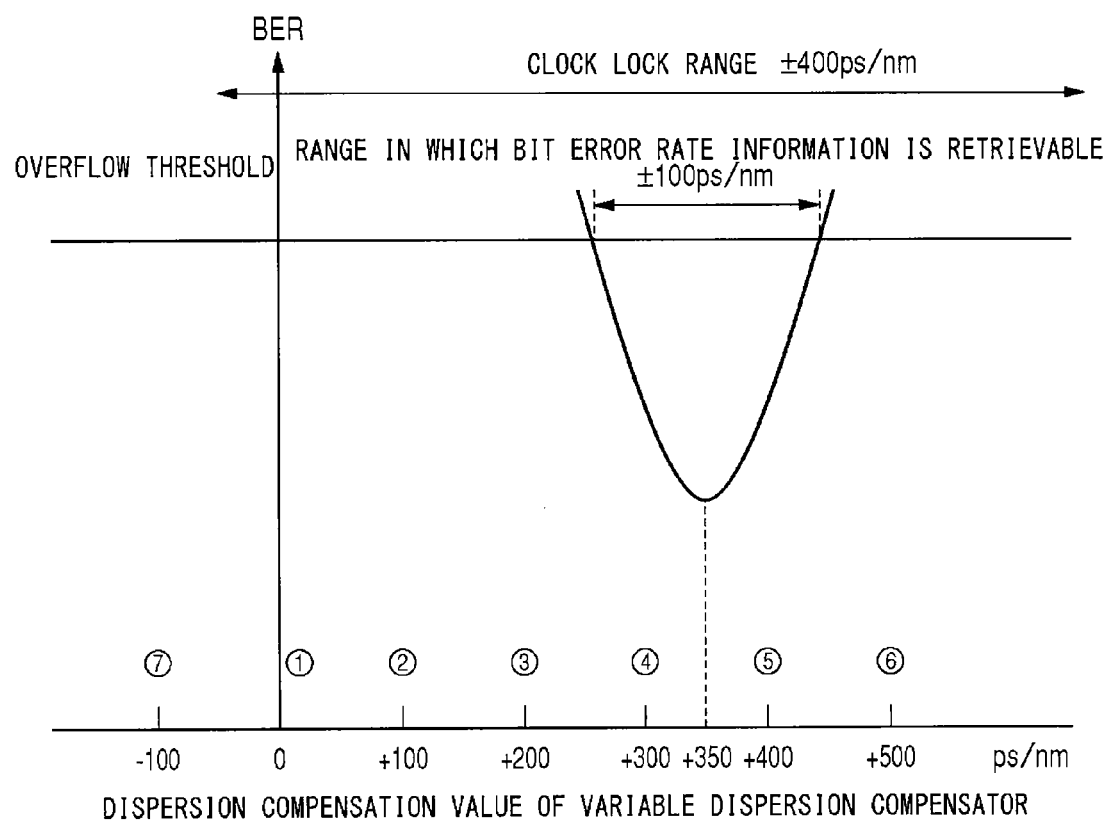
FIG. 3 shows a specific example of dispersion compensation control in the dispersion compensation device according to the embodiment.

FIG. 3 shows a specific example of dispersion compensation control in the dispersion compensation device 10 according to the embodiment. Referring to FIG. 3, the vertical axis represents the bit error rate (BER) and the horizontal axis represents the dispersion compensation value. It is assumed here that the dispersion compensation range of the variable dispersion compensator 12 is ±800 ps/nm, the range in which the clock signal is locked in the optical receiver 14 is ±400 ps/nm, and the range in which the bit error rate is retrievable (signal conduction range) is ±100 ps/nm.

After verifying that an optical signal is input, the controller 18 searches for the first dispersion compensation value that allows the clock signal to be locked. It is assumed here that the initially set dispersion compensation value is 0 ps/nm, and the first step increment is 500 ps/nm. Since the initially set dispersion compensation value is within the range in which the clock signal is locked, the clock signal is locked at the first dispersion compensation value=0 ps/nm.

Subsequently, the controller 18 starts searching for a dispersion compensation value based on the bit error rate information. It is assumed here that the second step increment is 100 ps/nm. First, the controller 18 performs a forward search, varying the dispersion compensation value in steps of 100 ps/nm. When the dispersion compensation value is set to +100 ps/nm, the bit error rate exceeds the overflow threshold value so that the bit error rate cannot be retrieved but the clock signal remains locked. Therefore, the search termination condition is not met and the forward search is continued. When the dispersion compensation value is set to +300 ps/nm, the bit error rate is retrieved so that it is possible to evaluate the optimality of the dispersion compensation value. When the forward search is continued and the dispersion compensation value is set to +500 ps/nm, the bit error rate exceeds the overflow threshold value. This means that the search termination condition (2) is met. In other words, transition has occurred from a state in which the bit error rate can be measured to a state in which the rate cannot be measured. Accordingly, the forward search is terminated.

Subsequently, the controller 18 initiates a backward search. When the dispersion compensation value is set to −100 ps/nm, the bit error rate exceeds the overflow threshold and loss of lock of the clock signal also occurs. Accordingly, the backward search is terminated.

Finally, by sweeping the dispersion compensation value over the signal conduction range of +300-+400 ps/nm in which the valid bit error rate is retrievable, and by identifying the dispersion compensation value that minimizes the bit error rate, the dispersion compensation value is set to an optimal value of +350 ps/nm.

Assuming that an attempt is made to set an optimal dispersion compensation value only by using the bit error rate information under the condition shown in FIG. 3, the bit error rate has to be measured over the entire range of ±800 ps/nm, which is the dispersion compensation range of the variable dispersion compensator 12. Meanwhile, according to the dispersion compensation device 10 of this embodiment, the number of points of measuring the bit error rate can be considerably reduced by variably controlling the dispersion compensation value of the variable dispersion compensator 12 based on the bit error rate information and the clock lock information. Therefore, the dispersion compensation value can be controlled at a high speed.

Given above is an explanation of the present invention based on an embodiment. The embodiment is intended to be illustrative only and it will be obvious to those skilled in the art that various modifications to constituting elements and processes could be developed and that such modifications are also within the scope of the present invention.

What is claimed is:

1. A dispersion compensation device comprising:
a variable dispersion compensator configured to subject an input optical signal to dispersion compensation;
an optical receiver configured to convert an optical signal subjected to dispersion compensation into an electrical signal, recover a clock signal and a received data signal from the electrical signal, and output clock lock information indicating whether the clock signal is locked to the electrical signal;
a signal processor configured to output bit error rate information on the received data signal; and
a controller configured to variably control a dispersion compensation value of the variable dispersion compensator based on the bit error rate information and the clock lock information,
wherein the controller identifies a first dispersion compensation value that allows the clock signal to be locked, by performing a search whereby the dispersion compensation value of the variable dispersion compensator is varied successively in a predetermined first step increment, and, afterwards, the controller variably controls the dispersion compensation value in the neighborhood of the first dispersion compensation value, based on the bit error rate information.

2. The dispersion compensation device according to claim 1, wherein, after the first dispersion compensation value is identified by the search, the controller identifies a range of dispersion compensation values in which the bit error rate information is retrievable by performing a search whereby the dispersion compensation value is successively increased from the first dispersion compensation value by a second step increment smaller than the first step increment until a predetermined search termination condition is met.

3. The dispersion compensation device according to claim 2, wherein the predetermined search termination condition includes occurrence of loss of lock of the clock signal.

4. The dispersion compensation device according to claim 2, wherein the predetermined search termination condition includes transition from a state in which the bit error rate can be measured to a state in which the rate cannot be measured.

5. The dispersion compensation device according to claim 2, wherein the predetermined search termination condition includes origination of a loss of frame signal from the signal processor.

6. The dispersion compensation device according to claim 1, wherein the first step increment is set to the maximum value on the condition that the clock signal is locked.

* * * * *